(12) United States Patent
Takahashi

(10) Patent No.: US 10,848,636 B2
(45) Date of Patent: Nov. 24, 2020

(54) IMAGE READING APPARATUS

(71) Applicant: CANON KABUSHIKI KAISHA, Tokyo (JP)

(72) Inventor: Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/573,846

(22) Filed: Sep. 17, 2019

(65) Prior Publication Data

US 2020/0106913 A1 Apr. 2, 2020

(30) Foreign Application Priority Data

Sep. 28, 2018 (JP) .................................. 2018-185434

(51) Int. Cl.
*H04N 1/195* (2006.01)
*H04N 1/08* (2006.01)
*H04N 1/00* (2006.01)

(52) U.S. Cl.
CPC ..... *H04N 1/19526* (2013.01); *H04N 1/00734* (2013.01); *H04N 1/0852* (2013.01)

(58) Field of Classification Search
CPC .......... H04N 2201/02454; H04N 2201/02458; H04N 2201/02466; H04N 2201/0247; H04N 2201/02479; H04N 2201/02485; H04N 1/0249; H04N 1/0303; H04N 1/195; H04N 1/0852; H04N 1/19526; H04N 1/00734; B31D 1/021; B31D 1/027; B31D 1/028; G06K 19/077; G06K 19/07718; G06K 19/07749; H01Q 1/2225; H01Q 1/22; Y10T 156/10; Y10T 29/49018; Y10T 29/49124; B23K 1/0008; B23K 31/02; B32B 2457/00; B32B 37/12; B32B 37/18; B29C 2049/2017; B29C 2049/2039; B29C 2049/2073; B29C 2049/2082; B29C 49/06; B29C 49/20; B29L 2031/463; F16D 2027/001; F16D 27/112
USPC ......................................................... 358/382
See application file for complete search history.

(56) References Cited

U.S. PATENT DOCUMENTS

| 6,271,912 | B1 * | 8/2001 | Kurosawa | .......... | H04N 1/00249 355/40 |
| 9,386,182 | B2 * | 7/2016 | Takahashi | .............. | H04N 1/195 |
| 2007/0121176 | A1 * | 5/2007 | Yamazaki | .............. | G02B 13/24 358/474 |
| 2007/0171295 | A1 * | 7/2007 | Kawai | .................... | H04N 5/217 348/340 |

(Continued)

FOREIGN PATENT DOCUMENTS

JP 2005-181433 A 7/2005

*Primary Examiner* — Negussie Worku
(74) *Attorney, Agent, or Firm* — Canon U.S.A., Inc. I.P. Division

(57) ABSTRACT

An image reading apparatus includes an optical unit through which a light from a document passes, an image sensor configured to receive the light from the document via the optical unit, and a first holding member configured to hold the optical unit and the image sensor. The first holding member has an opening and a second holding member is fitted in the opening. The optical unit is disposed on the second holding member and the second holding member is positioned with respect to the first holding member with a gap between the first holding member and the second holding member and fixed to the first holding member by an adhesive that fills the gap.

9 Claims, 9 Drawing Sheets

(56) References Cited

U.S. PATENT DOCUMENTS

| | | | | |
|---|---|---|---|---|
| 2007/0280668 A1* | 12/2007 | Kubo | ................... | G02B 7/04 |
| | | | | 396/133 |
| 2007/0297831 A1* | 12/2007 | Koyanagi | ............ | G03G 15/605 |
| | | | | 399/211 |
| 2008/0055421 A1* | 3/2008 | Kimura | ................ | G02B 27/646 |
| | | | | 348/208.99 |
| 2008/0062491 A1* | 3/2008 | Nakamura | ............... | B41J 2/471 |
| | | | | 359/200.1 |
| 2010/0091148 A1* | 4/2010 | Verkuijlen | ........... | H04N 5/2253 |
| | | | | 348/294 |
| 2010/0129116 A1* | 5/2010 | Shinkawa | ........ | G03G 15/04036 |
| | | | | 399/200 |
| 2012/0307318 A1* | 12/2012 | Suga | ................... | H04N 1/0249 |
| | | | | 358/474 |
| 2013/0009037 A1* | 1/2013 | Takahashi | .......... | H04N 1/02835 |
| | | | | 250/208.1 |
| 2013/0222862 A1* | 8/2013 | Sasaki | ............... | H04N 1/02855 |
| | | | | 358/474 |
| 2013/0321879 A1* | 12/2013 | Takahashi | ............ | G02B 6/0088 |
| | | | | 358/474 |
| 2013/0321880 A1* | 12/2013 | Takahashi | .............. | B23K 31/02 |
| | | | | 358/482 |
| 2014/0078560 A1* | 3/2014 | Nagao | ................ | H04N 1/02481 |
| | | | | 358/474 |
| 2014/0110945 A1* | 4/2014 | Takahashi | ............... | F01K 27/02 |
| | | | | 290/54 |
| 2014/0240802 A1* | 8/2014 | Otomo | ................ | H04N 1/1026 |
| | | | | 358/497 |
| 2015/0060229 A1* | 3/2015 | Takahashi | ............... | F16D 27/112 |
| | | | | 192/12 D |
| 2015/0365555 A1* | 12/2015 | Kinoshita | ................ | G01J 1/04 |
| | | | | 358/484 |
| 2017/0351159 A1* | 12/2017 | Kudo | ....................... | G02B 7/09 |
| 2019/0174044 A1* | 6/2019 | Honsho | ............... | H04N 5/2327 |

* cited by examiner

IMAGE READING APPARATUS

BACKGROUND OF THE INVENTION

Field of the Invention

The present disclosure relates to an image reading apparatus configured to read a document.

Description of the Related Art

A configuration of a conventional image reading apparatus is described with reference to FIGS. 8A and 8B. FIG. 8A is a perspective diagram of the image reading apparatus. FIG. 8B is a cross-sectional diagram of the image reading apparatus. An image reading apparatus 204 includes a platen glass 201 where a document 200 is placed, a reading unit 202 to read an image on the document 200, and a motor 203 to move the reading unit 202 in a sub-scanning direction. The reading unit 202 reads the image on the document 200 placed on the platen glass 201 while being moved in the sub-scanning direction.

Light reflected from the document 200 placed on the platen glass 201 is guided by a mirror 103 and concentrated onto an image sensor 106 by an image forming unit 100. The image sensor 106 photoelectrically converts the light and outputs image information corresponding to quantity of the received light.

The image sensor 106 is a line sensor. A longitudinal direction of a line sensor is referred to as a main-scanning direction. A direction perpendicular to the main-scanning direction is referred to as a sub-scanning direction.

The image forming unit 100 includes a cylindrical lens barrel 101 which contains a plurality of lenses 102, as illustrated in FIGS. 9A, 9B, and 9C. The image forming unit 100 is fixed, with a plate spring 10, on a plate-shaped member 206 on which the image sensor 106 is mounted. The image sensor 106 is disposed at the focal point of the image forming unit 100.

The plate-shaped member 206 has a rectangular hole 205 that has a width smaller than the outer diameter of the cylindrical lens barrel 101 of the image forming unit 100. The outer periphery of the cylindrical lens barrel 101 comes into contact with the rectangular hole 205 so that the image forming unit 100 is positioned on the plate-shaped member 206.

The plate-shaped member 206 is made of sheet metal such as zinc steel sheet metal. The rectangular hole 205 is formed on the plate-shaped member 206 by die-cut processing with a mold.

Depending on the accuracy of a finished size of the formed rectangular hole, the image forming unit 100 may be sometimes positioned to be inclined upward or downward as well as rightward or leftward with respect to a reference optical axis of the reading unit 202. This inclination may cause an image including a defect such as partial blur or image distortion.

Conventionally, precision of the die-cut processing for the rectangular hole is pursued to prevent the image from being defective, resulting in worsening an yield.

Japanese Laid-Open Patent Application 2005-181433 discusses that the plate-shaped member where the image forming unit is placed is arranged to adjust the inclination in an upward or downward direction and a rightward or leftward direction of the image forming unit with the plate spring or an adjustment screw. In a case where the plate-shaped member is provided with such an adjustment configuration discussed in Japanese Laid-Open Patent Application 2005-181433, the number of parts of the plate-shaped member increases and thus manufacturing cost also increases.

SUMMARY OF THE INVENTION

The present disclosure is directed to suppressing the cost of the configuration for positioning an image forming unit and achieving the necessary accuracy of positioning an image forming unit.

According to an aspect of the present disclosure, an image reading apparatus includes an image forming unit configured to form an image of light from a document, an image sensor configured to receive the light from the document via the image forming unit, and a first holding member configured to hold the image forming unit and the image sensor, wherein the first holding member has an opening and a second holding member is fitted in the opening, the image forming unit is disposed on the second holding member, and the second holding member is positioned with respect to the first holding member with a gap between the first holding member and the second holding member and fixed to the first holding member with an adhesive that fills the gap.

Further features of the present disclosure will become apparent from the following description of exemplary embodiments with reference to the attached drawings.

DESCRIPTION OF THE EMBODIMENTS

Figure 8A:
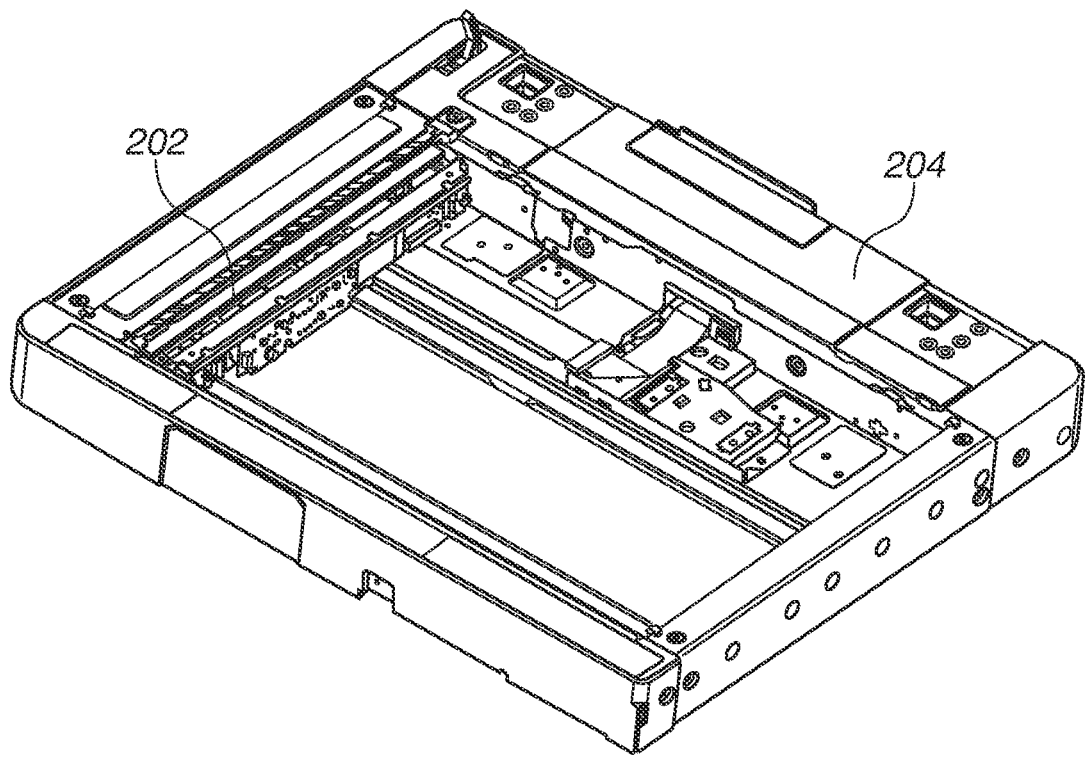
FIG. 8A is a schematic diagram and FIG. 8B is a cross-sectional diagram of an image reading apparatus.
Figure 8B:
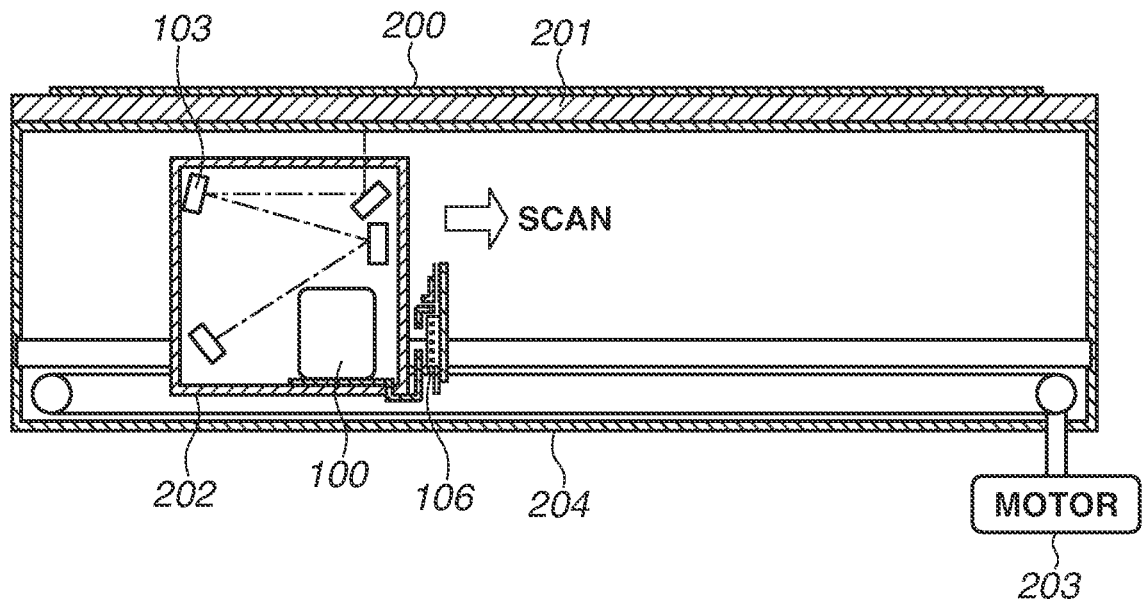
Figure 9A:
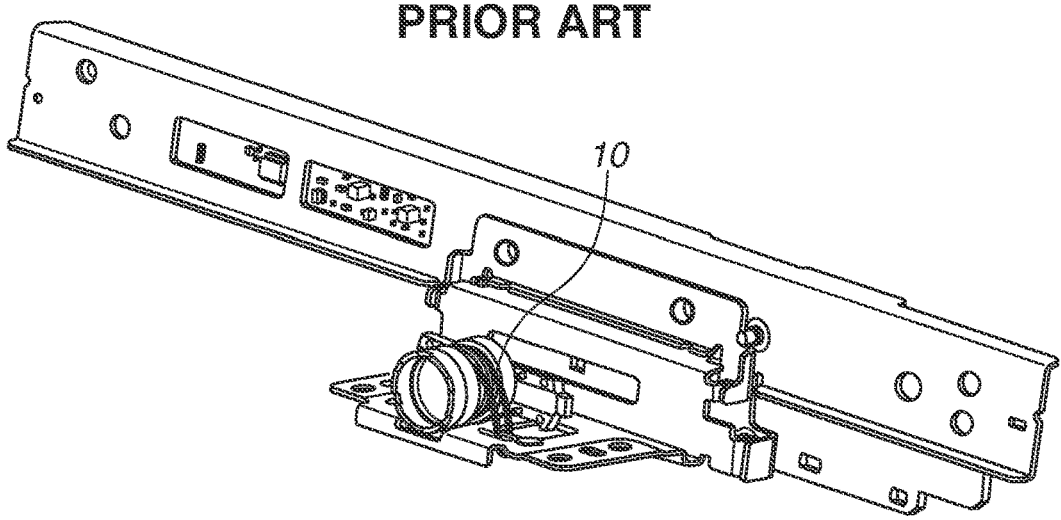
FIGS. 9A and 9B are schematic diagrams of a conventional image forming unit.
Figure 9B:
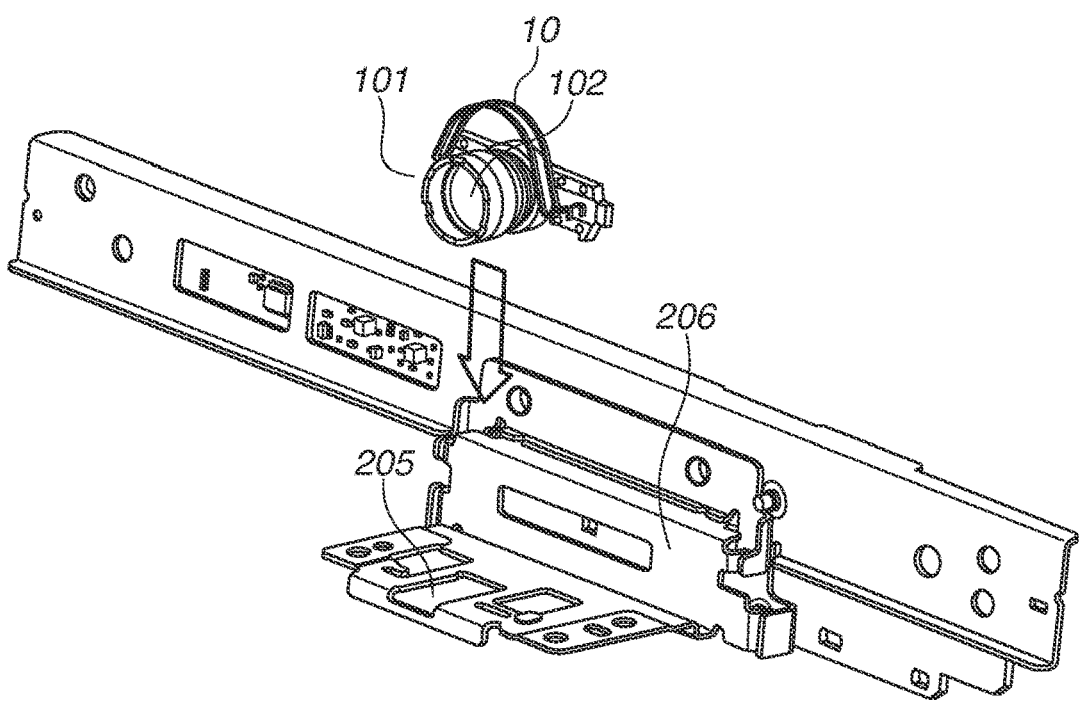
Figure 9C:
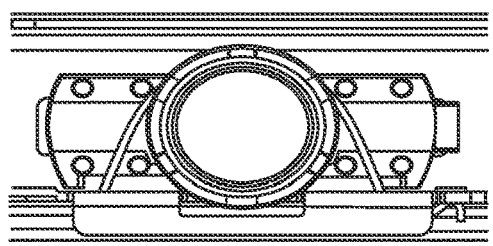
FIG. 9C is a front view of the conventional image forming unit.

A basic configuration of an image reading apparatus according to the present exemplary embodiment is similar to a configuration of an imaging reading apparatus illustrated in FIGS. 8A and 8B. An image reading apparatus 204 includes a platen glass 201 where a document 200 is placed, a reading unit 202 to read an image on the document 200, and a motor 203 to move the reading unit 202 in a sub-scanning direction. The reading unit 202 reads the image on the document 200 placed on the platen glass 201 while being moved in the sub-scanning direction.

Light reflected from the document 200 placed on the platen glass 201 is guided by a mirror 103 and concentrated onto an image sensor 106 by an image forming unit 100. The image sensor 106 photoelectrically convert light and outputs image information corresponding to a quantity of the received light.

The image sensor 106 is a line sensor. A longitudinal direction of the line sensor is referred to as a main-scanning direction. A direction perpendicular to the main-scanning direction is referred to as the sub-scanning direction.

Figure 1:
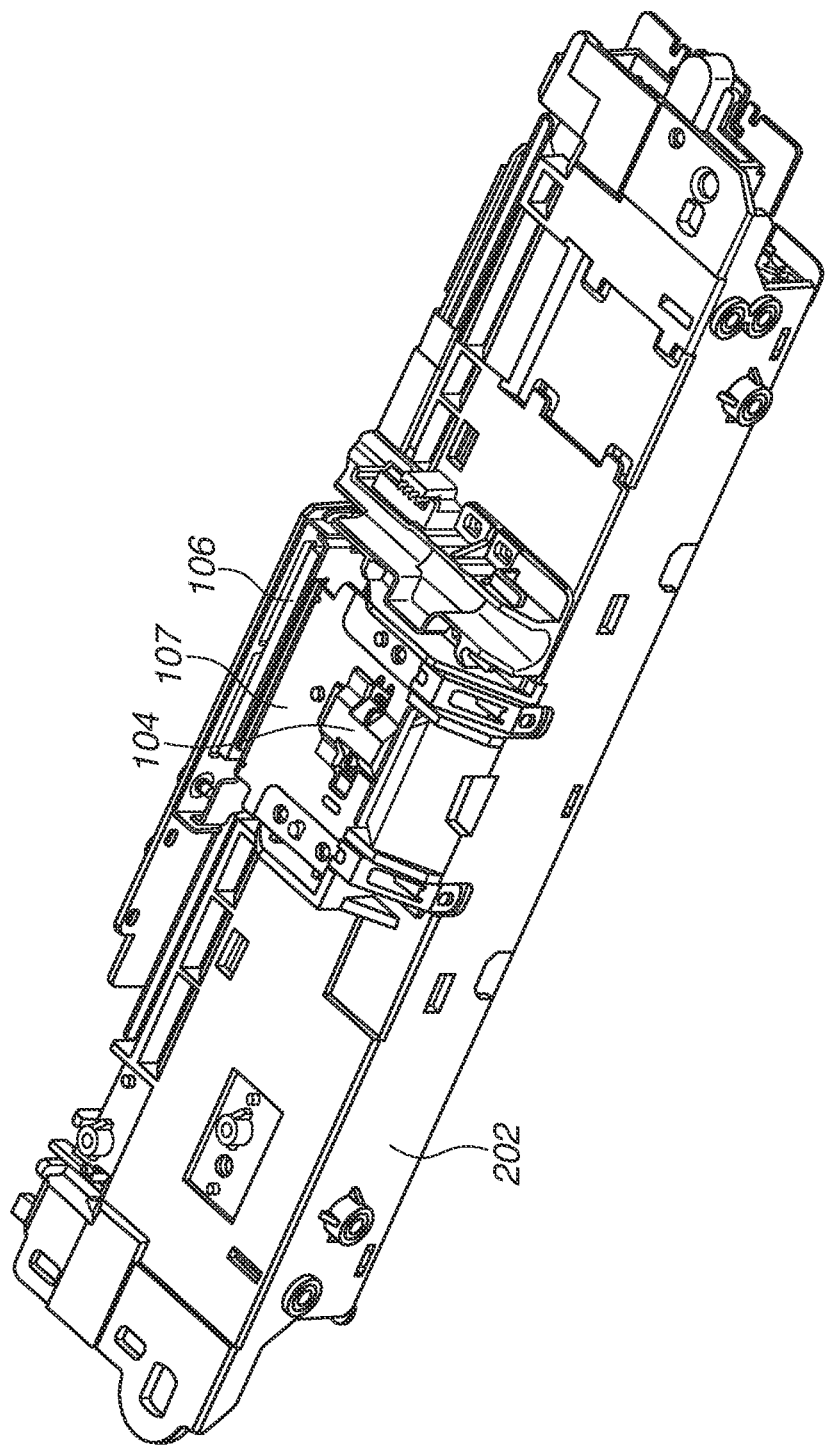
FIG. 1 is a perspective diagram of a reading unit.
Figure 2:
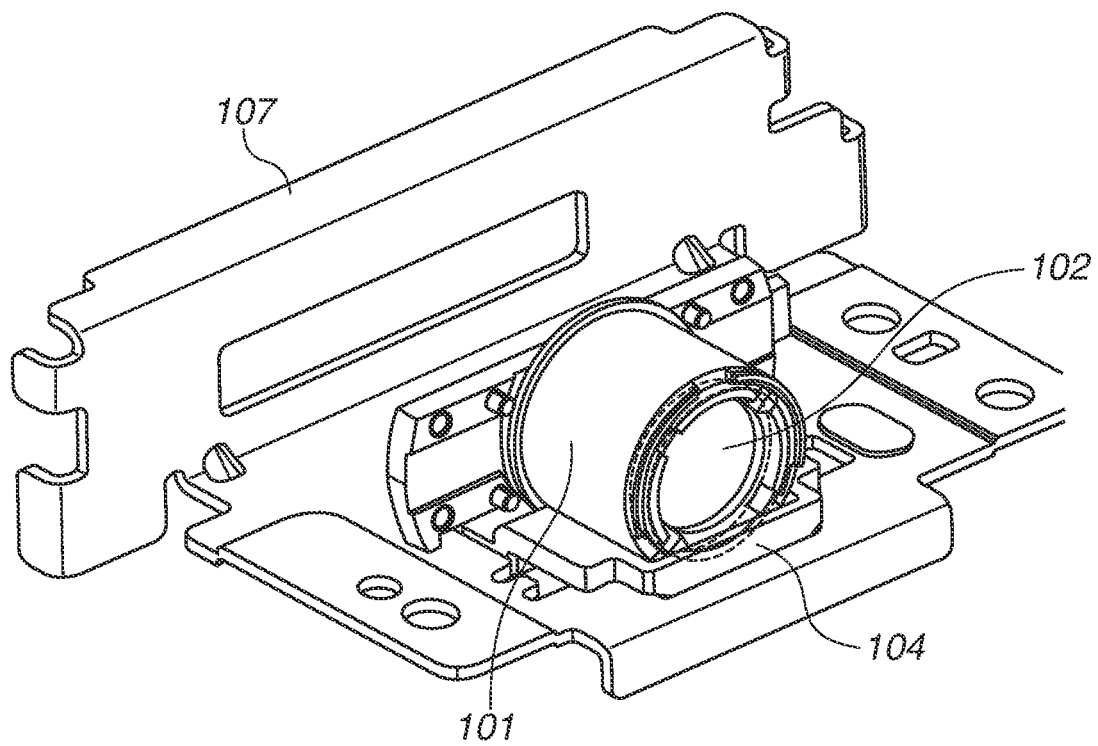
FIG. 2 is a perspective diagram of an image forming unit.
Figure 3:
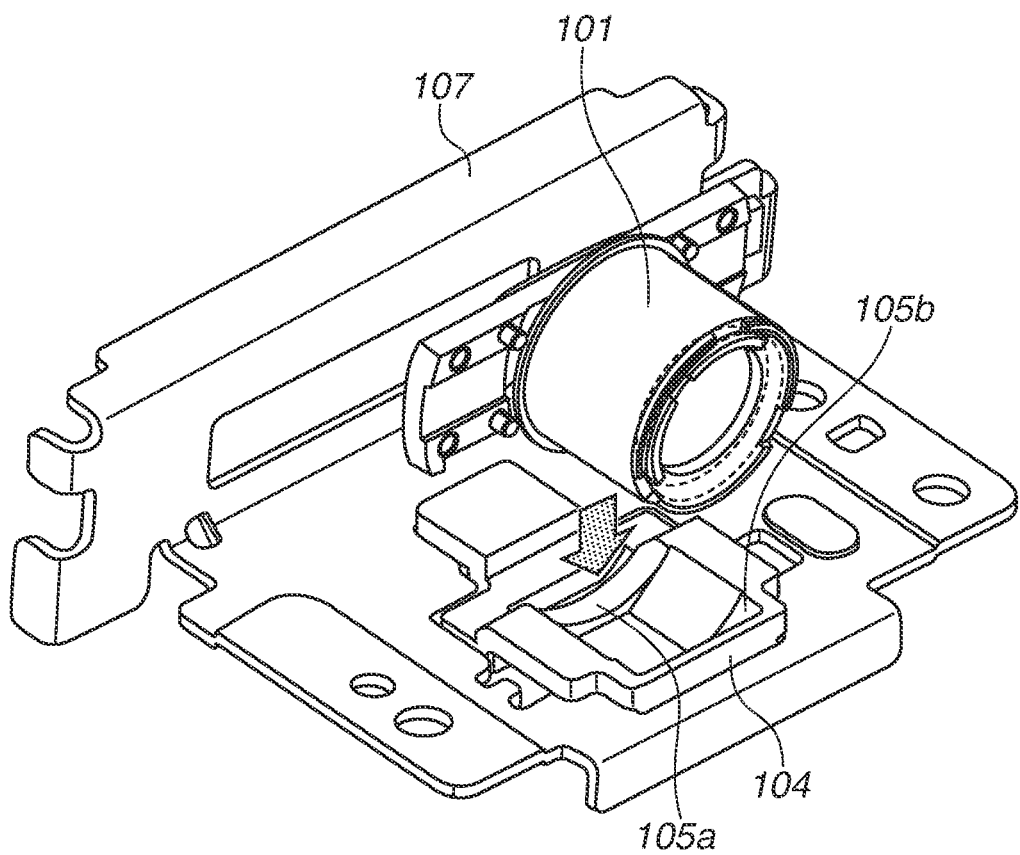
FIG. 3 is a perspective (exploded) diagram of the image forming unit.

FIG. 1 is a perspective diagram of the reading unit 202 according to the present exemplary embodiment, where the reading unit 202 is turned over so that the back side thereof appears. FIG. 2 is a perspective diagram of the image forming unit 100. FIG. 3 is an exploded diagram of the image forming unit 100.

A plate-shaped member 107, on which the image sensor 106 and the image forming unit 100 are arranged, is attached to the reading unit 202. The plate-shaped member 107 is made of sheet metal such as zinc steel sheet metal. The plate-shaped member 107 has a first surface on which the image forming unit 100 is held and a second surface on which the image sensor 106 is held. A rectangular hole as an opening is formed in the first surface of the plate-shaped member 107. A lens barrel holding member 104 is placed in the rectangular hole. Because the image forming unit 100 and the image sensor 106 are held on the plate-shaped member 107 made by processing sheet metal, the positional relationship between the image forming unit 100 and the image sensor 106 can be determined with high accuracy.

The image forming unit 100 is arranged such that a plurality of lenses 102 is contained in a cylindrical lens barrel 101. FIG. 2 illustrates only the frontmost lens, but the cylindrical lens barrel 101 contains other lenses (not illustrated). The cylindrical lens barrel 101 is arranged at a predetermine position on the lens barrel holding member 104 attached to the plate-shaped member 107. In this way, the image forming unit 100 can be positioned in relation with the plate-shaped member 107.

The lens barrel holding member 104 that holds the lens barrel is an integrally-formed member. In addition, the lens barrel holding member 104 has lens barrel contact surfaces 105a and 105b that are curved surfaces with a curvature approximately the same as that of an outer periphery of the cylindrical lens barrel 101. The lens barrel contact surface 105a is provided on an upstream side of a light path along a reference optical axis of light reflected from the document, and the lens barrel contact surface 105b is provided at a downstream side of the light path along the reference optical axis. The lens barrel contact surfaces 105a and 105b are provided on the upstream and downstream sides of the light path along the reference optical axis of the light reflected from the document, respectively, so that the cylindrical lens barrel 101 can be positioned in parallel to the reference optical axis with high accuracy.

Figure 5:
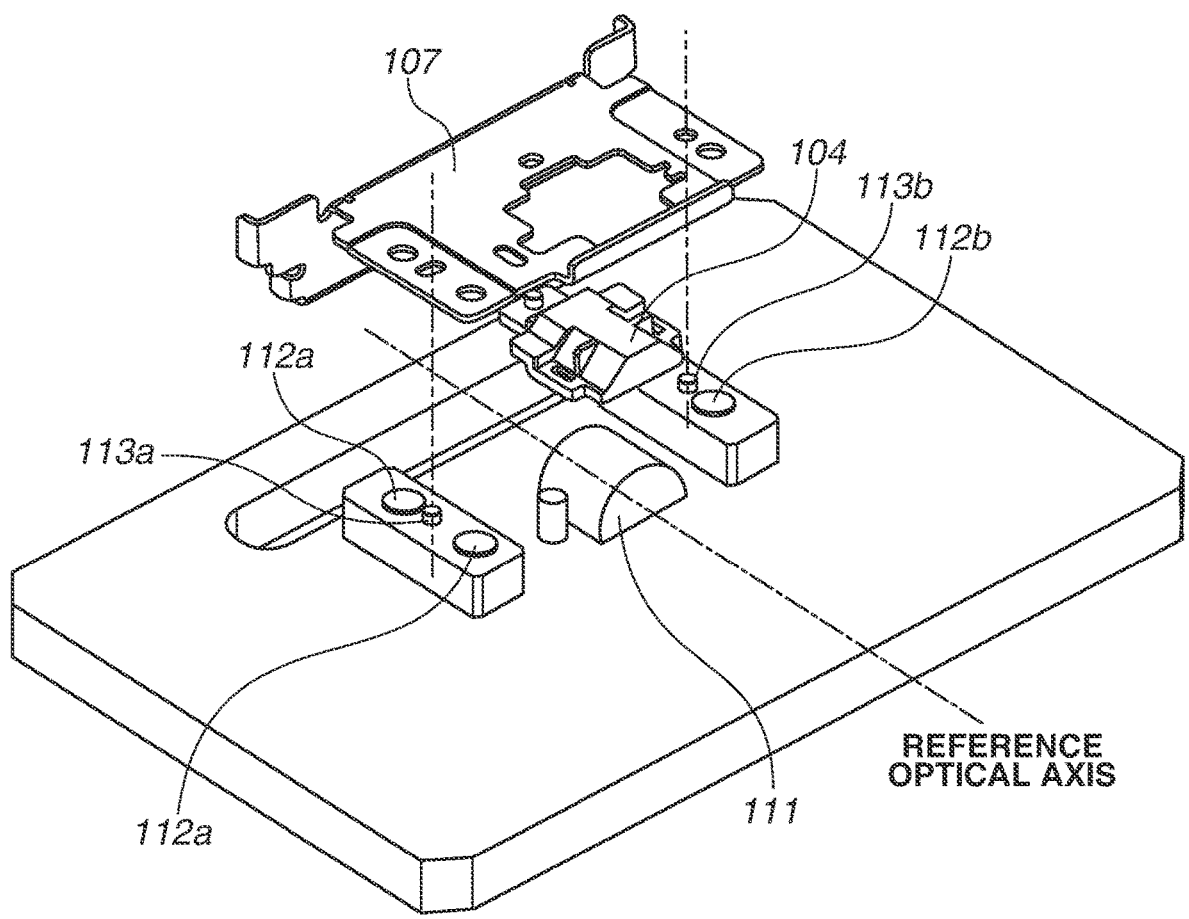
FIG. 5 is a diagram illustrating an assembling method of attaching the lens barrel holding member to the plate-shaped member.

An assembling method of attaching the lens barrel holding member 104 to the plate-shaped member 107 is to be described with reference to FIG. 5. A master lens barrel tool 111, which is preliminarily formed so as to be placed in parallel to the reference optical axis of the reading unit, is used. The master lens barrel tool 111 has reference surfaces 112 that serve as an attachment reference of the reading unit 202, and reference pins 113, as well as a master lens barrel unit.

An assembler presses the lens barrel contact surfaces 105a and 105b of the lens barrel holding member 104 onto the master lens barrel tool 111. Next, the assembler presses the plate-shaped member 107 onto the lens barrel holding member 104 from above the master lens barrel tool 111 on which the lens barrel holding member 104 is mounted. At the same time, the assembler fits a reference pin 113a and a reference pin 113b into two setting reference holes provided in the plate-shaped member 107, and also presses setting portions provided on the plate-shaped member 107 onto a plurality of reference surfaces 112a and a plurality of reference surfaces 112b. In FIG. 5, one of the reference surfaces is hidden under the lens barrel holding member 104. The master lens barrel tool 111 is provided with the reference surfaces 112a and 112b and the reference pins 113a and 113b as illustrated in FIG. 5 so that the plate-shaped member 107 pressed onto the master lens barrel tool 111 can be arranged with a suitable posture with respect to the reference optical axis.

Figure 4:
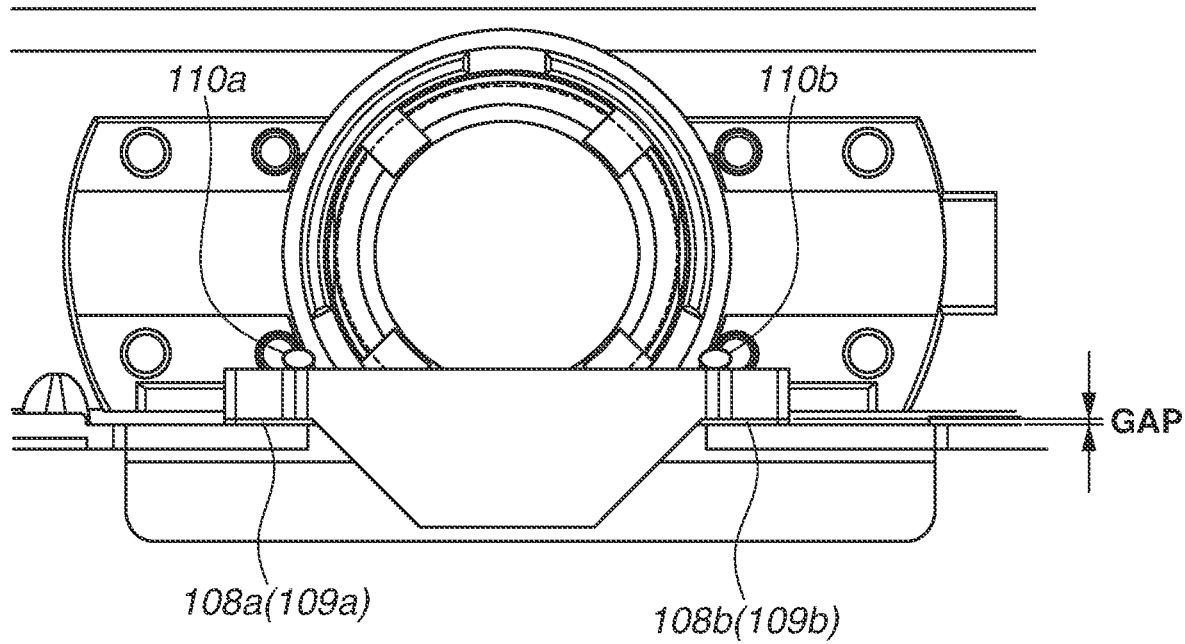
FIG. 4 is a front view of a plate-shaped member on which a lens barrel holding member and the image forming unit are placed.

FIG. 4 is a front view of the plate-shaped member 107 on which the lens barrel holding member 104 and the image forming unit (optical unit) 100 are placed. The lens barrel holding member 104 does not contact with the plate-shaped member 107, and a gap 108a and a gap 108b, each of which is about 0.2 to 0.3 mm wide, are formed between the lens barrel holding member 104 and the plate-shaped member 107. In other words, the posture of the lens barrel holding member 104 and the posture of the plate-shaped member 107 can be determined independently from each other so as to be suitably arranged in relation to the reference optical axis set with respect to the master lens barrel tool 111. The gaps 108a and 108b are filled with resinous adhesives 109a and 109b and then the resinous adhesives 109a and 109b are cured so that the lens barrel holding member 104 can be attached to the plate-shaped member 107.

The assembling method of attaching the image forming unit 100 to the plate-shaped member 107 to which the lens barrel holding member 104 is attached is to be described. The image forming unit 100 is pressed onto the lens barrel contact surfaces 105a and 105b of the lens barrel holding member 104 which is attached to the plate-shaped member 107 and then adhesively fixed at portions 110a and 110b.

According to the assembling method described above, the optical axis of the image forming unit 100 that is attached to the plate-shaped member 107 via the lens barrel holding member 104 can be positioned in parallel to the reference optical axis. The lens barrel holding member 104 and the plate-shaped member 107 are placed on the master lens barrel tool 111 and then adhesively fixed. In this way, the lens barrel holding member 104 can be attached to the plate-shaped member 107.

As illustrated in FIG. 3, since the cylindrical lens barrel 101 is placed on the lens barrel contact surfaces 105a and 105b of the lens barrel holding member 104 and then adhesively fixed, the image forming unit 100 can be attached to the plate-shaped member 107 to which the lens barrel holding member 104 is attached. Since there is no need to attach the image forming unit 100 to the plate-shaped member 107 with springs as conventionally, automatic assembling with a robot can be easily accomplished.

After the image forming unit 100 is attached to the plate-shaped member 107, the image sensor 106 is engaged with and fixed to the plate-shaped member 107. The resultant assembly is attached to the reading unit 202.

Figure 6:
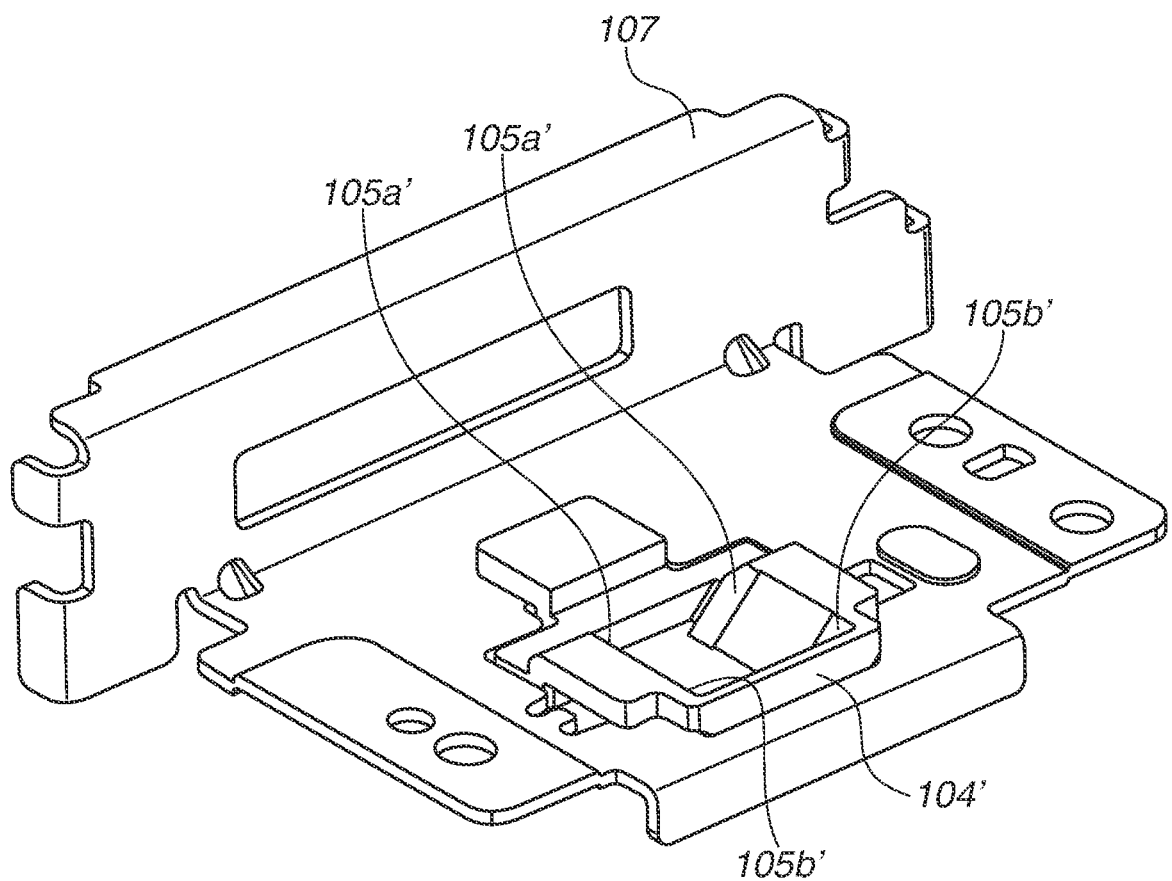
FIG. 6 is a diagram illustrating an example of a modification of the lens barrel holding member.

The shape of the lens barrel contact surfaces 105a and 105b that comes into contact with the outer periphery of the lens barrel holding member 104 is not limited to the shapes mentioned above. Other example of the lens barrel contact surface is to be described with reference to FIG. 6. In this example, a lens barrel contact surface 105a' and a lens barrel contact surface 105b', each of which comes into contact with the outer periphery of the lens barrel holding member 104, take the form of a V-shaped inclined surface.

Since the cylindrical lens barrel 101 linearly contacts the lens barrel contact surfaces 105a' and 105b', shape accuracy (flatness and position) of the V-shaped inclined surface does not easily affect the assembling. A surface-to-surface contact, as in a first exemplary embodiment, easily causes optical axis deviation of the reading unit because foreign objects such as dust enter between the contact surfaces. A line-to-line contact, as in a second exemplary embodiment, can keep the optical axis deviation to the minimum because the possibility that the foreign objects enter between the contact line areas decreases.

Figure 7:
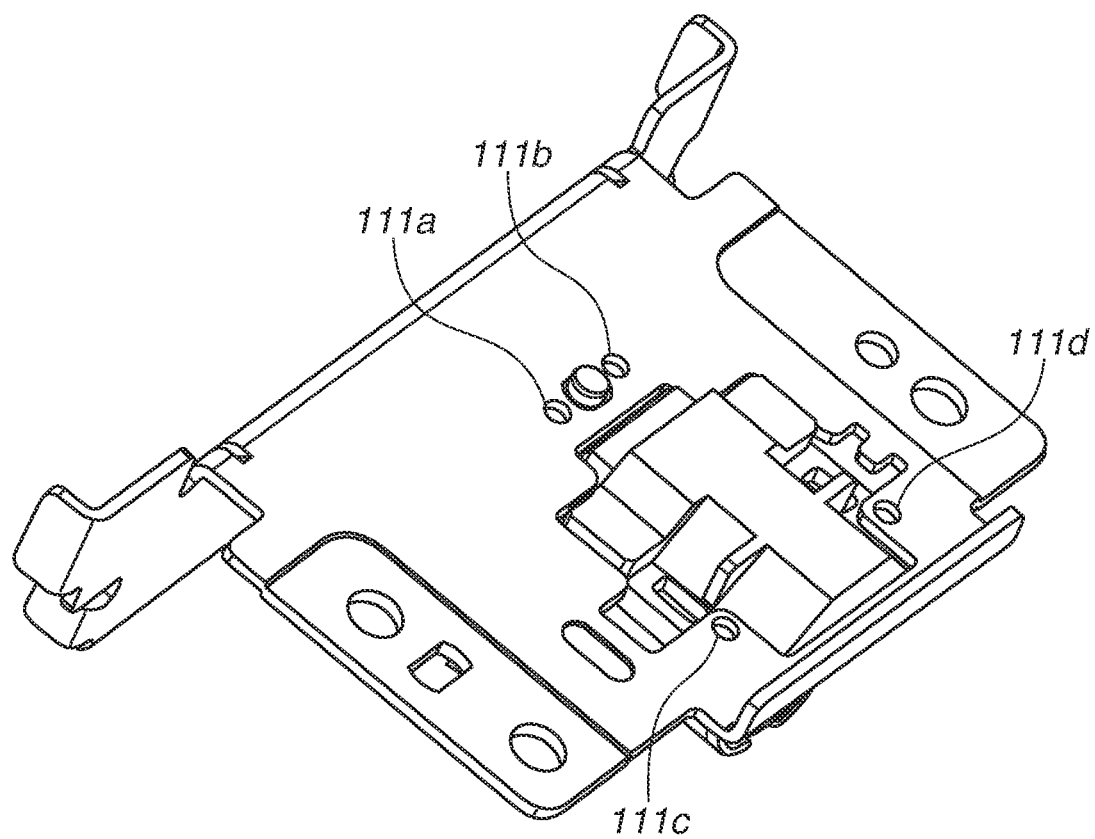
FIG. 7 is a diagram illustrating an example of a modification of the plate-shaped member.

The lens barrel holding member 104 may adhere to the plate-shaped member 107 with an ultraviolet cure adhesive. The example of adhesion using the ultraviolet cure adhesive is to be described with reference to FIG. 7.

In a similar way to the example described above, the lens barrel holding member 104 does not contact the plate-shaped member 107, so that the gaps 108a and 108b, which are about 0.2 to 0.3 mm wide, are formed between the lens barrel holding member 104 and the plate-shaped member 107. In this way, the lens barrel holding member 104 and the plate-shaped member 107 are positioned independently from each other. The ultraviolet cure adhesive fills the gaps 108a and 108b between the lens barrel holding member 104 and the plate-shaped member 107, and then is cured with ultraviolet irradiation. The gaps of about 0.2 to 0.3 mm wide are narrow as gaps to be filled with the adhesive after both the lens barrel holding member 104 and the plate-shaped member 107 are positioned. Accordingly, irradiation windows 111c and 111d are formed in the plate-shaped member 107 so that the ultraviolet cure adhesive is supplied through the irradiation windows 111c and 111d and then is irradiated with ultraviolet rays. In the example illustrated in FIG. 7, the irradiation windows 111a and 111b are also formed in the plate-shaped member 107 to increase the places for adhesive fixation.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-185434, filed Sep. 28, 2018, which is hereby incorporated by reference herein in its entirety.

What is claimed is:

1. An image reading apparatus comprising:
    an optical unit through which a light from a document passes;
    an image sensor configured to receive the light from the document via the optical unit;
    a first holding member configured to hold the image sensor, and
    a second holding member configured to hold the optical unit,
    wherein the first holding member has a first surface in which an opening is formed and a second surface on which the image sensor is held,
    wherein the second holding member is fitted in the opening, and
    wherein the second holding member is positioned with respect to the first holding member with a gap between the first holding member and the second holding member and fixed to the first surface of the first holding member with an adhesive that fills the gap.

2. The image reading apparatus according to claim 1,
    wherein the optical unit includes a lens and a cylindrical lens barrel that contains the lens, and
    wherein the second holding member includes a lens barrel contact surface, and the cylindrical lens barrel is in contact with and fixed to the lens barrel contact surface.

3. The image reading apparatus according to claim 2,
    wherein the lens barrel contact surface includes a first contact surface and a second contact surface, which are in contact with the cylindrical lens barrel at different positions.

4. The image reading apparatus according to claim 3,
    wherein the lens barrel contact surface positions the cylindrical lens barrel by using two inclined surfaces.

5. The image reading apparatus according to claim 2,
    wherein each of the first contact surface and the second contact surface is a curved surface.

6. The image reading apparatus according to claim 1,
    wherein the optical unit is fixed to the second holding member with an adhesive.

7. The image reading apparatus according to claim 1,
    wherein the adhesive that fills the gap is an ultraviolet cure adhesive, and
    wherein the ultraviolet cure adhesive is supplied through an opening that is formed in the second holding member, irradiated with ultraviolet rays, and cured.

8. The image reading apparatus according to claim 1, wherein the second holding member does not contact with the first holding member.

9. The image reading apparatus according to claim 1, wherein the first surface is vertical to the second surface.

* * * * *